US005746895A

United States Patent [19]

Sekhar

[11] Patent Number: 5,746,895
[45] Date of Patent: May 5, 1998

[54] COMPOSITE REFRACTORY/CARBON COMPONENTS OF ALUMINIUM PRODUCTION CELLS

[75] Inventor: Jainagesh A. Sekhar, Cincinnati, Ohio

[73] Assignee: Moltech Invent S.A., Luxembourg

[21] Appl. No.: 535,160

[22] PCT Filed: Nov. 12, 1993

[86] PCT No.: PCT/US93/10993

§ 371 Date: Oct. 20, 1995

§ 102(e) Date: Oct. 20, 1995

[87] PCT Pub. No.: WO95/13407

PCT Pub. Date: May 18, 1995

[51] Int. Cl.$^6$ .................................................. C25C 3/08
[52] U.S. Cl. .................... 204/279; 204/290 R; 427/122; 427/126.1; 427/126.2; 427/372.2; 428/689; 428/697; 428/698; 428/699; 428/702
[58] Field of Search ................................ 204/279, 290 R; 427/126.1, 126.2, 122, 372.2; 428/689, 697, 698, 699, 702, 704

[56] References Cited

U.S. PATENT DOCUMENTS

| | | | |
|---|---|---|---|
| 4,308,115 | 12/1981 | Foster, Jr. et al. | 204/67 |
| 4,678,760 | 7/1987 | Ray | 501/96 |
| 4,975,191 | 12/1990 | Bruckmeyer et al. | 210/510.1 |
| 5,217,583 | 6/1993 | Sekhar et al. | 204/67 |

*Primary Examiner*—Kathryn Gorgos
*Assistant Examiner*—William T. Leader
*Attorney, Agent, or Firm*—Dinsmore & Shohl LLP

[57] ABSTRACT

A component of an aluminum production cell, in particular a cathode or a cell lining of an electrolytic cell for the production of aluminum by the electrolysis of alumina in cryolite, having an aluminum-wettable refractory coating on a heat-stable baked carbon-containing body, is produced from a part-manufactured cell component which is a layered composite of two precursors. A precursor layer of the aluminum-wettable refractory coating contains at least one aluminum-wettable refractory material in particulate form, or a particulate micropyretic reaction mixture which, when ignited, reacts to form at least one aluminum-wettable refractory material, or a mixture thereof, and non-carbon fillers and binders. A non-baked or part-baked precursor of the heat-stable carbon-containing body comprises particulate carbon compacted with a heat-convertible binder which when subjected to heat treatment binds the particulate carbon into the heat-stable carbon-containing body of the fully-manufactured cell component. This layered composite is convertible to the fully-manufactured cell component by heat treatment to form the aluminum-wettable refractory coating and simultaneously bind and heat-stabilize the carbon-containing body.

154 Claims, No Drawings

COMPOSITE REFRACTORY/CARBON COMPONENTS OF ALUMINIUM PRODUCTION CELLS

This is a national stage application of PCT/US93/10993, filed on Nov. 12, 1993.

FIELD OF THE INVENTION

The invention relates to the application of refractory borides to carbon-based components of cells for the production of aluminium by electrolysis of alumina dissolved in a cryolite-based and other molten halide electrolytes, in particular carbon cathodes. The invention also relates to such cells having carbon-based components protected from the corrosive attacks of liquids and/or gaseous components of the electrolyte in the form of elements, ions or compounds, by having refractory borides applied to their surfaces, as well as the use of these cells for the production of aluminium.

BACKGROUND OF THE INVENTION

Aluminium is produced conventionally by the Hall-Héroult process, by the electrolysis of alumina dissolved in cryolite-based molten electrolytes at temperatures up to around 950° C. A Hall-Héroult reduction cell typically has a steel shell provided with an insulating lining of refractory material, which in turn has a lining of carbon which contacts the molten constituents. Conductor bars connected to the negative pole of a direct current source are embedded in the carbon cathode substrate forming the cell bottom floor. The cathode substrate is usually an anthracite based carbon lining made of prebaked cathode blocks, joined with a ramming mixture of anthracite, coke, and coal tar.

In Hall-Héroult cells, a molten aluminium pool acts as the cathode. The carbon lining or cathode material has a useful life of three to eight years, or even less under adverse conditions. The deterioration of the cathode bottom is due to erosion and penetration of electrolyte and liquid aluminium as well as intercalation of sodium, which causes swelling and deformation of the cathode carbon blocks and ramming mix. In additon, the penetration of sodium species and other ingredients of cryolite or air leads to the formation of toxic compounds including cyanides.

Difficulties in operation also arise from the accumulation of undissolved alumina sludge on the surface of the carbon cathode beneath the aluminium pool which forms insulating regions on the cell bottom. Penetration of cryolite and aluminium through the carbon body and the deformation of the cathode carbon blocks also cause displacement of such cathode blocks. Due to displacement of the cathode blocks, aluminium reaches the steel cathode conductor bars causing corrosion thereof leading to deterioration of the electrical contact, non uniformity in current distribution and an excessive iron content in the aluminium metal produced.

Extensive research has been carried out with Refractory Hard Metals (RHM) such as $TiB_2$ as cathode materials. $TiB_2$ and other RHM's are practically insoluble in aluminium, have a low electrical resistance, and are wetted by aluminium. This should allow aluminium to be electrolytically deposited directly on an RHM cathode surface, and should avoid the necessity for a deep aluminium pool. Because titanium diboride and similar Refractory Hard Metals are wettable by aluminium, resistant to the corrosive environment of an aluminium production cell, and are good electrical conductors, numerous cell designs utilizing Refractory Hard Metal have been proposed, which would present many advantages, notably including the saving of energy by reducing the ACD.

The use of titanium diboride and other RHM current-conducting elements in electrolytic aluminium production cells is described in U.S. Pat. Nos. 2,915,442, 3,028,324, 3,215,615, 3,314,876, 3,330,756, 3,156,639, 3,274,093 and 3,400,061. Despite extensive efforts and the potential advantages of having surfaces of titanium diboride at the cell cathode bottom, such propositions have not been commercially adopted by the aluminium industry.

Various types of $TiB_2$ or RHM layers applied to carbon substrates have failed due to poor adherence and to differences in thermal expansion coefficients between the titanium diboride material and the carbon cathode block.

U.S. Pat. No. 3,400,061 describes a cell without an aluminium pool but with a drained cathode of Refractory Hard Metal which consists of a mixture of Refractory Hard Metal, at least 5 percent carbon, and 10 to 20% by weight of pitch binder, baked at 900° C. or more and rammed into place in the cell bottom. Such composite cathodes have found no commercial use probably due to susceptibility to attack by the electrolytic bath.

U.S. Pat. No. 3,661,736 claims a composite drained cathode for an aluminium production cell, comprising particles or pieces of arc-melted "RHM alloy" embedded in an electrically conductive matrix of carbon or graphite and a particulate filler such as aluminium carbide, titanium carbide or titanium nitride. However, in operation, grain boundaries and the carbon or graphite matrix are attacked by electrolyte and/or aluminium, leading to rapid destruction of the cathode.

U.S. Pat. No. 4,093,524 discloses bonding tiles of titanium diboride and other Refractory Hard Metals to a conductive substrate such as graphite. But large differences in thermal expansion coefficients between the RHM tiles and the substrate cause problems.

U.S. Pat. No. 4,308,114 discloses a cathode surface of RHM in a graphitic matrix made by mixing the RHM with a pitch binder and graphitizing at 2350° C. or above. Such cathodes are subject to early failure due to rapid ablation, and possible intercalation by sodium and erosion of the graphite matrix.

U.S. Pat. No. 4,466,996 proposed applying a coating composition comprising a pre-formed particulate RHM, such as $TiB_2$, a thermosetting binder, a carbonaceous filler and carbonaceous additives to a carbonaceous cathode substrate, followed by curing and carbonisation. But it was still not possible by this method to obtain coatings of satisfactory adherence that could withstand the operating conditions in an aluminium production cell.

The use of self-propagating combustion synthesis (also called micropyretic reaction) to produce net shaped ceramic electrodes for use in aluminium production has been described in WO 92/13977 and WO 92/22682, wherein a particulate combustion mixture for producing a ceramic or metal-ceramic composite was mixed with particulate fillers and inorganic binders. None of these materials contained carbon.

U.S. Pat. No. 5,310,476 (Sekhar et al.) discloses a method of producing a protective refractory coating on a substrate of, inter-alia, carbonaceous materials by applying to the substrate a micropyretic reaction layer from a slurry containing particulate reactants in a colloidal carrier, and initiating a micropyretic reaction. The micropyretic slurry optionally also contains some preformed refractory material, and the micropyretic slurry may be applied on a non-reactive sub-layer.

U.S. Pat. No. 5,364,513 (Sekhar et al.) discloses a body of carbonaceous material coated with a protective surface coating which improves the resistance of the body to oxidation or corrosion and which may also enhance the bodies electrical conductivity and/or its electrochemical activity. This protective coating is applied from a colloidal slurry containing particulate reactant or non-reactant substances, or a mixture of particulate reactant and non-reactant substances, which when the body is heated to a sufficient elevated temperature form the protective coating by reaction sintering and/or sintering without reaction.

U.S. Pat. No. 5,374,342 (Sekhar et al.) describes a component of an aluminium production cell made of a carbon-based composite material containing a refractory hard metal compound selected from borides, carbides, nitrides, oxides and combinations and mixtures thereof, and at least one of aluminium, aluminium alloys and aluminium compounds. Combinations of the aforesaid compounds include borocarbides, and oxycompounds such as oxynitrides. The method of production comprises firstly providing a reaction mixture of aluminium and precursors which react to form the refractory hard metal boride, carbide or borocarbide or mixtures thereof, and optional fillers and additives. The reaction mixture is then mixed with particulate carbon in an amount of from 1 to 20 parts by weight of carbon for 1 part by weight of the reaction mixture; and with a colloidal binder containing at least one of colloidal silica, alumina, yttria, ceria, thoria, zirconia, magnesia, lithia, the amount of the colloidal binder being sufficient to fully wet the carbon particles.

The resulting mixture is pressed or compacted into shape and dried and heated to initiate reaction of the reaction mixture by self-propagating micropyretic reaction. It is then possible to coat the formed block or mass with a coating of desired composition including, in particular for cathode applications, coatings of an aluminium wettable material such as titanium diboride or other refractory metal borides, carbides, nitrides etc. or to bond layers of such materials to the formed block or mass.

U.S. Pat. No. 5,507,933 (Sekhar et al.) discloses a cell component of an electrolytic cell for aluminium production comprising a solidified carbon containing paste which is a compact mixture of one or more particulate carbonaceous material(s) with a non-carbonaceous non-polluting colloidal binder and optionally with one or more fillers, the binder being a suspension of one or more colloids, or being derived from one or more colloid precursors or colloid reagents optionally with one or more chelating agents. The binder is for example a suspension containing at least one of colloidal silica, alumina, yttria, ceria, thoria, zirconia, magnesia or lithia. Particularly when the cell component is a cathode or a cell lining, the formed mass or block can be coated with an aluminium-wettable refractory material.

U.S. Pat. No. 5,320,717 (Sekhar et al.), provides a method of bonding bodies of Refractory Hard Material (RHM) or other refractory composites to carbon cathodes of aluminium protection cells using a colloidal slurry comprising particulate preformed RHM in a colloidal carrier selected from colloidal alumina, colloidal yttria and colloidal ceria as a glue between the bodies and the cathode or other component. The slurry is dried to bond the bodies to the cathode or other component, the dried slurry acting as a conductive thermally-matched glue which provides excellent bonding of the bodies to the cathode or other component.

To date, no carbon-based composite material containing an aluminium-wettable refractory hard material has proven satisfactory for use as component of aluminium production cells. Such materials have been expensive to produce and it has been difficult to produce the materials in large pieces serviceable in aluminium production cells. Moreover, the resistance of such materials to attack by melt components has been unsatisfactory. Attempts to coat carbon-based materials with an aluminium-wettable refractory coating or to attach plates or tiles of such materials, have also not yet overcome all of the problems, in particular adherence, resistance to thermal shock, etc.

OBJECTS OF THE INVENTION

The invention aims to overcome the deficiencies of past attempts to utilize refractory materials in particular refractory borides for protecting the surface of carbonaceous cathodes, cell linings or other cell components from the attack of corrosive liquids in aluminium production cells.

An object of the invention is to provide composite structures having refractory boride coatings that are well adherent to a carbon-containing substrate body and have the desired mechanical, physical, chemical, and electrochemical characteristics.

One specific object of the invention is to provide a part-manufactured cell component which can easily be converted into a cell component with an aluminium-wettable refractory layer on a carbon-containing body, which has superior properties when used as a cathode or cell lining of an aluminium production cell, to protect such carbonaceous material from the attack of sodium and air which produces deformation of the cathode blocks and formation of dangerous nitrogen compounds such as cyanides.

Another specific object of the invention is to provide an easy-to-implement method of producing composite carbon-containing cell components coated with refractory borides from part-manufactured components by heat treatment preferably before use of the cell component.

By protecting the carbonaceous cell components from attack by NaF or other aggressive ingredients of the electrolyte, the cell efficiency is improved. Because NaF in the electrolyte no longer reacts with the carbon cell bottom and walls, the cell functions with a defined bath ratio without a need to replenish the electrolyte with NaF.

The aluminum-wettable refractory coating, preferably a boride, will also permit the elimination of the thick aluminium pool required to partially protect the carbon cathode, enabling the cell to operate with a drained cathode.

The refractory boride coatings have the following attributes: excellent wettability by molten aluminium, excellent adherence to the carbon-containing substrates, inertness to attack by molten aluminium and cryolite, low cost, environmentally safe, ability to absorb thermal and mechanical shocks without delamination from the anthracite-based carbon or other carbon-based substrates, durability in the environment of an aluminium production cell, and ease of application and processing.

A futher object of the invention is to produce refractory boride coatings on a carbon-based substrate from a part-manufactured composite component, for instance with a graphite or anthracite-based carbon substrate used in an aluminium production cell in contact with the molten electrolyte and/or with molten aluminium, whereby the coating of the composite body protects the substrate against the ingress of cryolite and sodium and is in turn protected by the protective film of aluminium on the coating itself.

The coated components thus produced find many applications on account of their excellent resistance, protection, and stability when exposed to the corrosive action of liquids and fumes existing in the cell or formed during electrolysis even when the temperature of operation is low as in the Low Temperature electrolysis process for the production of aluminium (see for example U.S. Pat. No. 4,681,671 and PCT application PCT/EP92/02666 WO 93/10281 MOL0510).

SUMMARY OF THE INVENTION

In its main aspect the invention provides a part-manufactured component of an aluminium production cell, in particular a cathode or a cell lining of an electrolytic cell for the production of aluminium by the electrolysis of alumina in a halide-based molten electrolyte, such as cryolite or other fluoride based melts, fluoride-chloride melts or possibly chloride melts, which cell component when fully manufactured comprises an aluminium-wettable refractory coating on a heat-stable baked carbon-containing body.

According to the invention, this part-manufactured cell component is a layered composite of two precursors, namely a precursor layer of the aluminium-wettable refractory coating on a non-baked or part-baked precursor of the heat-stable carbon-containing body.

The precursor layer of the aluminium-wettable refractory coating contains at least one aluminium-wettable refractory material in particulate form, or a particulate micropyretic reaction mixture which when ignited reacts to form at least one aluminium-wettable refractory material, or a mixture thereof, and non-carbon fillers and binders.

The non-baked or part-baked precursor of the heat-stable carbon-containing body comprises particulate carbon compacted with a heat-convertible binder which when subjected to heat treatment binds the particulate carbon into the heat-stable carbon-containing body of the fully-manufactured cell component.

This layered composite forming the part-manufactured cell component is convertible to the fully-manufactured cell component by heat treatment to form the aluminium-wettable refractory coating and simultaneously bind and heat-stabilize the carbon-containing body, thus coforming the coating and the body whereby the coating is firmly attached to the body.

The precursor of the heat-stable carbon-containing body may comprise a compacted mixture of particulate carbon, a particulate micropyretic reaction mixture which when ignited reacts to form at least one aluminium-wettable refractory material, and a colloidal binder.

The precursor layer of the aluminium-wettable refractory coating may contain a particulate micropyretic reaction mixture which when ignited reacts to form at least one aluminium-wettable refractory material, mixed with pre-formed particulate aluminium-wettable refractory material and a colloidal binder.

In one specific embodiment, the precursor of the heat-stable carbon-containing body and the precursor layer of the aluminium-wettable refractory coating each contain the same reaction mixture and the same colloidal binder.

Usually, the precursor of the heat-stable carbon-containing body contains from 0.5 to 20 parts by weight of particulate carbon for 1 part by weight of the reaction mixture and the precursor layer contains from 0.5 to 20 parts by weight of pre-formed particulate aluminium-wettable refractory material for 1 part by weight of the reaction mixture.

Advantageously, the precursor of the heat-stable carbon-containing body contains from 1 to 8 parts by weight, preferably from 1.5 to 4 parts by weight, of particulate carbon for 1 part by weight of the reaction mixture, and the coating precursor layer contains from 1 to 8 parts by weight, preferably from 1.5 to 4 parts by weight, of pre-formed particulate aluminium-wettable refractory material for 1 part by weight of the reaction mixture.

Moreover, the weight fraction of the reaction mixture in the precursor of the heat-stable carbon-containing body is preferably at least approximately the same as the weight fraction of the reaction mixture in the precursor layer, thus providing for uniform reaction conditions throughout the body and coating.

A preferred reaction mixture comprises aluminium, boron oxide and titanium dioxide at least approximately in the molar ratio: $10Al:3B_2O_3:3TiO_2$.

Usually, the reaction mixture and particulate carbon of the precursor of the heat-stable carbon-containing body are mixed with from 0.1 ml to 1 ml, preferably from 0.15 ml to 0.5 ml, of the colloidal binder per gram of the reaction mixture plus the particulate carbon. This colloidal binder of the heat-stable carbon-containing body may comprise at least one of colloidal alumina, silica, yttria, ceria, thoria, zirconia, magnesia, lithia and hydroxides, acetates and formates thereof as well as oxides and hydroxides of other metals, cationic species and mixtures thereof.

The reaction mixture and the pre-formed particulate refractory material of the precursor layer of the refractory coating are also preferably mixed with from 0.1 ml to 1 ml, preferably from 0.15 ml to 0.5 ml, of the colloidal binder per gram of the reaction mixture plus the pre-formed particulate refractory hard material. This colloidal binder of the precursor layer may also comprise the same colloids as mentioned above, and advantageously both the precursor layer of the aluminium-wettable refractory coating and the precursor of the heat-stable carbon-containing body contain colloidal alumina.

In another advantageous embodiment, the precursor layer of the aluminium-wettable refractory coating consists of pre-formed particulate refractory material in a dried colloid, in particular a pre-formed boride selected from borides of titanium, chromium, vanadium, zirconium, hafnium, niobium, tantalum, molybdenum and cerium.

For instance, the pre-formed particulate refractory boride in the precursor layer is titanium diboride and the reaction mixture of the precursor of the heat-stable carbon-containing material reacts to produce titanium diboride.

Such pre-formed particulate refractory boride in the coating precursor layer preferably has a particle size below 100 micrometers and comprises particles of different sizes to optimize packing of the particles, with a particle size ratio of at least 2:1. The particle size ratio of the pre-formed particulate refractory boride is preferably in the range 3:1 to 10:1, with particles with sizes in the range from about 3 micrometers to about 50 micrometers.

In another embodiment, the precursor of the heat-stable carbon-containing body comprises a compacted mixture of particulate carbon with aluminium and with at least one compound of lithium, aluminium, cerium, calcium and sodium in a liquid carrier, which mixture reacts when heated to form a binder comprising at least one of aluminium carbide, aluminium oxycarbide, aluminium nitride and aluminium oxynitride or mixtures thereof with metallic aluminium.

For example, the precursor of the heat-stable carbon-containing body comprises an aluminium compound selected from aluminium nitrate, aluminium carbonate, aluminium halides, aluminium borate and aluminium carbide and mixtures thereof.

Alternatively, or additionally, the precursor of the heat-stable carbon-containing body comprises a lithium compound selected from lithium acetate, lithium carbonate, lithium fluoride, lithium chloride, lithium oxalate, lithium nitride, lithium nitrate, lithium formate and lithium aryl, lithium tetraborate and mixtures thereof.

Usually, the precursor of the heat-stable carbon-containing body comprises 1 to 20 parts by weight of particulate aluminium for 80 to 99 parts by weight of particulate carbon, the particulate aluminium and particulate carbon being mixed with the compounds in the liquid carrier in an amount of 5 to 20 ml of the liquid carrier per 100 grams of the particulate aluminium and particulate carbon.

The aforesaid liquid carrier of this embodiment usually has a binding agent selected from methyl cellulose, polyvinyl alcohol and colloids, in particular colloid alumina. Exemplary colloids include those of alumina, silica, yttria, ceria, thoria, zirconia, magnesia, lithia and hydroxides, acetates and formates thereof as well as oxides and hydroxides of other metals, cationic species and mixtures thereof.

The particulate aluminium in the precursor of the heat-stable carbon body preferably has a dimension of at most 44 micrometer (–325 mesh) and may be wet milled aluminium derived from scrap foil.

The precursor layer of the aluminium-wettable refractory coating of this embodiment may also contain a particulate micropyretic reaction mixture which when ignited reacts to form at least one aluminium-wettable refractory material, mixed with pre-formed particulate aluminium-wettable refractory material and a colloidal binder, according to the details set out above.

Alternatively, the precursor layer of the aluminium-wettable refractory coating consists of preformed particulate refractory material in a dried colloid, once again according to the details set out above.

In another embodiment of the part-manufactured cell component, the precursor of the heat-stable carbon-containing body comprises a compacted mixture of particulate carbon with a non-carbonaceous non-polluting colloidal binder and optionally with one or more fillers, the binder being a suspension of one or more colloids, or being derived from one or more colloid precursors or colloid reagents optionally with one or more chelating agents.

In this case, the precursor of the heat-stable carbon-containing body usually comprises 50 to 99 weight % of particulate carbon (preferably 50 to 95%), 0 to 30 weight % of fillers and 1 to 30 weight % of the binder (preferably 5 to 30%).

Advantageously, the precursor of the heat-stable carbon-containing body comprises aluminium, alumina or a mixture of aluminium and alumina as filler(s), and colloidal alumina as binder.

Again, with this substrate-forming body, the precursor layer of the aluminium-wettable refractory coating can be any of those set out above, i.e. with a micropyreticic reaction mixture, or with pre-formed particulate refractory material, or mixtures thereof.

The particulate carbon of the precursor of the heat-stable carbon-containing body is selected from petroleum coke, metallurgical coke, anthracite, graphite, amorphous carbon, fullerene or a mixture thereof, wherein the size of the particulate carbon is up to 40 mm, preferably between 1 micrometer and 30 mm. and the particulate carbon preferably contains between 5% and 40% of particles having a size below 0.2 mm.

At least part of the particulate carbon may be fibrous.

The resulting heat-stable carbon-containing body practically always contains at least 50 weight % of carbon, usually from 70 to 85 weight % of carbon.

Generally, the precursor of the heat-stable carbon-containing body can include one or more fillers selected from: bonding enhancing materials such as methylcellulose, particulate alumina or urea; metallic, intermetallic, semi-metallic, polymeric, refractory and/or ceramic materials such as borides, carbides, nitrides, silicides, oxides, oxynitrides, and mixtures thereof; pyrolizable chlorosilanes, polycarbosilanes, polysilanes and other organometal polymers which pyrolyze to useful products for enhancing bonding, or their pyrolyzed products; and mixtures thereof.

In another embodiment of the part-manufactured cell component, the precursor of the heat-stable carbon-containing body comprises a compact mixture of particulate carbon with pitch as a heat-curable carbonaceous binder, for example a mixture of particulate anthracite, metallurgical coke and graphite with pitch, e.g. according to the usual mixtures used to produce cathodes of aluminium production cells.

In the case of a pitch binder, the precursor of the heat-stable carbon-containing body can further comprise one or more of the non-carbonaceous colloidal binders listed above. The precursor layer of the aluminium-wettable refractory coating preferably contains a particulate micropyretic reaction mixture which when ignited reacts to form the aluminium-wettable refractory material, mixed with pre-formed particulate aluminium-wettable refractory material and a colloidal binder. Alternatively, the precursor layer of the aluminium-wettable refractory coating on the pitch-bound body consists of pre-formed particulate refractory material in a dried colloid.

METHOD OF PRODUCTION

Another aspect of the invention is a method of manufacturing a component of an aluminium production cell, in particular a cathode or a cell lining of an electrolytic cell for the production of aluminium by the electrolysis of alumina in a fluoride-based or mixed fluoride-chloride or a chloride-based molten electrolyte, which cell component comprises an aluminium-wettable refractory coating layer on a heat-stable baked carbon-containing body, the method comprising providing a part-manufactured cell component which is a layered composite of two precursors, as set out above, and converting the layered composite to the fully-manufactured cell component by heat treatment to form the aluminium-wettable refractory coating and simultaneously bind and heat-stabilize the carbon-containing body.

The type of heat treatment will depend on the types of reactants and binders present. In those cases where a micropyretic reaction mixture is present in one or both of the precursors of the coating and the body, the heating will be sufficient to initiate a self-sustaining micropyretic reaction, as exemplified below.

This method can be applied to all of the different embodiments and features of the part-manufactured components set out above.

As a rule, the heat treatment will generally be carried out prior to fitting or assembly of the components in an aluminium production cell.

To assist rapid wetting of the components by molten aluminium, the refractory material coated on the substrate may be exposed to molten aluminium in the presence of a flux assisting penetration of aluminium into the refractory material, the flux for example comprising a fluoride, a chloride or a borate, of at least one of lithium and sodium, or mixtures thereof. Such treatment favors aluminization of the refractory coating by the penetration therein of aluminium.

This aluminization treatment can be carried out prior to or after fitting the components in an aluminium production cell.

CELL COMPONENTS AND CELLS

The invention also relates to components of an aluminium production cell, in particular a cathode or a cell lining of an electrolytic cell for the production of aluminium by the electrolysis of alumina in a molten halide electrolyte, usually a fluoride-based molten electrolyte, which cell components are obtained by simultaneous heat treatment of a layered composite of two precursors, and comprising:

- an aluminium-wettable refractory coating obtained from a precursor layer containing at least one aluminium-wettable refractory material in particulate form, or a particulate micropyretic reaction mixture which when ignited reacts to form at least one aluminium-wettable refractory material, or a mixture thereof, and non-carbon fillers and binders; on
- a heat-stable baked carbon-containing body obtained from a non-baked or part-baked precursor comprising particulate carbon compacted with a heat-convertible binder which when subjected to heat treatment binds the particulate carbon into the heat-stable carbon-containing body of the fully-manufactured cell component.

The cell component is usually in the form of a cathode block that can be assembled into a cathodic cell bottom, and the aluminium-wettable refractory coating is preferably aluminized prior to-use of the component in the cell.

The component advantageously forms part of a cathode through which the electrolysis current flows, the refractory boride coating forming a cathodic surface in contact with the cathodically-produced aluminium. For example, if it is part of a drained cathode, the refractory boride coating forms the cathodic surface on which the aluminium is deposited cathodically, and the component is arranged usually upright or at a slope for the aluminium to drain from the cathodic surface.

Another aspect of the invention is an aluminium production cell comprising a component as defined above which in operation of the cell is exposed to molten cryolite or aluminium, this component in particular being a cathode or forming part of a cathodic cell bottom.

The invention also encompasses use of such cells for the production of aluminium by the electrolysis of alumina dissolved in a halide melt such as a cryolite-based molten electrolyte, where the product aluminium is in contact with the aluminium-wettable refractory coating on the component.

A method of assembling and operating the cells comprises producing composite cell components as set out above by heat treating part-manufactured components in the form of blocks to produce carbon-based bodies coated with aluminium-wettable refractory coatings; placing the coated components in the cell so the coatings of refractory material will be contacted by the cathodically produced aluminium; and operating the cell with the coating protecting the substrate from attack by the cathodically-produced aluminium and by the molten electrolyte.

Operation of the cell is advantageously in a low temperature process, with the molten halide electrolyte containing dissolved alumina at a temperature below 900° C., usually at a temperature from 680° C. to 880° C. The low temperature electrolyte may be a fluoride melt, a mixed fluoride-chloride melt or a chloride melt.

This low temperature process is operated at low current densities on account of the low alumina solubility. This necessitates the use of large anodes and corresponding large cathodes, exposing large areas of these materials to the corrosive conditions in the cell, such large exposed areas being well protected by the refractory coatings according to the invention which are just as advantageous at these lower temperatures.

However, the invention is particularly advantageous also in conventional cell designs where the components are assembled to form the cell bottom, thus enabling retrofitting of existing cells with the inclusion of an aluminium-wettable cathode suface.

DETAILED DESCRIPTION OF A PREFERRED EMBODIMENT

A preferred embodiment of the invention will be further described by way of example. In this example, the upper layer, which is the precursor layer of the aluminium-wettable refractory coating, contains a particulate micropyretic reaction mixture of aluminium, boron oxide and titanium dioxide in the molar ratio: $10Al:3B_2O_3:3TiO_2$, mixed with pre-formed particulate aluminium-wettable refractory material and colloidal alumina as binder.

The bottom layer, which is the precursor of the heat-stable carbon-containing body, comprises a compacted mixture of particulate carbon, the same particulate micropyretic reaction mixture of aluminium, boron oxide and titanium dioxide as the top layer, and also colloidal alumina as binder.

The reaction mixture was prepared from 37.5 wt % particulate Al, 99.5% pure, −325mesh (44 micron), 29 wt % purified particulate $B_2O_3$ (Fisher, Catalogue No. A76-500), and 33.4 wt % particulate $TiO_2$, 99+% pure, −300 mesh. These weight percentages correspond to the above-indicated molar proportions.

An example of the invention was carried out on laboratory scale as follows. An amount of 80 g of the reaction mixture powders was dry mixed for approximately 1 hour. The mixing time can be adjusted depending on the amount the combustion material powder and the type of mixer.

The Upper Layer

The composition of the upper layer is 35 wt % of the reaction mixture (approximately 13.1 wt % Al, 10.2 wt % $B_2O_3$ and 11.7 wt % $TiO_2$) and 65 wt % titanium diboride powder, −325 mesh (44 micron), to which is added 30 ml of Wesbond colloidal alumina liquid binder (Wesol™ −12%) per 100 g of reaction mixture plus titanium diboride powder. This binder has a specific gravity of 1.07 and contains 12 wt % alumina (3.85 g alumina/30 ml). After drying at 200° C., assuming all water is evaporated, the composition of the upper layer is about 12.65 wt % Al, 9.8 wt % $B_2O_3$, 11.25 wt % $TiO_2$, 62.6 wt % $TiB_2$ and 3.7 wt % $Al_2O_3$.

The Bottom Layer

The composition of the bottom layer is 35 wt % of the reaction mixture (approximately 13.1 wt % Al, 10.2 wt % $B_2O_3$ and 11.7 wt % $TiO_2$) and 65 wt % mixed anthracite powder powder, particles sized between 1 micrometer and 30 mm containing up to 40% of particules having a size belw 0.2 mm, to which is added 30 ml of Wesbond colloidal alumina liquid binder (Wesol™ –12%) per 100 g of the reaction mixture and carbon. This binder has a specific gravity of 1.07 and contains 12 wt % alumina (3.85 g alumina/30 ml). After drying at 200° C., assuming all water is evaporated, the composition of the bottom layer is about 12.65 wt % Al, 9.8 wt % $B_2O_3$, 11.25 wt % $TiO_2$, 62.6 wt % anthracite and 3.7 wt % $Al_2O_3$.

Procedure

Bottom Layer: 52.5 g of the reaction mixture and 97.5 g of pre-mixed anthracite powder were mixed thoroughly. 45 ml Wesbond colloidal alumina binder were added to the mixture and stirred completely so all the anthracite particles were wrapped in the slurry. During mixing, the slurry became warmer. The slurry was allowed to cool, which takes about 20 minutes for a 150 g sample.

Upper Layer: 17.5 g of the reaction mixture and 32.5 g titanium diboride powder were dry mixed for 1 hour. The mixing time depends on the amount of powder and the type of mixer. 15 ml Wesbond colloidal alumina binder were added to the mixture and stirred completely. The slurry was allowed to cool, which takes about 20 minutes for a 50 g sample.

The Upper Layer mixture was then put in a die and the Bottom Layer mixture put into the die second. A pressure of 530 Kg/cm² was applied with a die of about 5 cm diameter, to obtain a pressed cylinder made of the two layers.

The composite cylinder was removed from the die and allowed to dry in air for 24 hours. Then the cylinder was placed in a furnace at 200° C. for at least 5 hours. The drying time depends on the sample size. A large size needs a longer drying time.

The composite cylinder was then placed in a furnace pre-heated to 1150° C. until combustion occurs. For a 200 g sample, it takes about 10 minutes to complete combustion: larger samples should take longer. After combustion, the cylinder was immersed in carbon powder for about ½ hour, then allowed to cool in air.

The resulting sample had an adherent aluminium-wettable refractory coating of titanium diboride/alumina on a carbon-based support also containing titanium diboride/alumina.

When tested as cathode in a laboratory aluminium production cell, the sample showed good wettability with molten aluminium and no sign of deterioration. The aluminium was found to penetrate the coating and remain there.

I claim:

1. A part-manufactured component of an aluminium production cell, for the production of aluminium by the electrolysis of alumina in a molten halide electrolyte, which cell component when fully manufactured comprises an aluminium-wettable refractory coating on a heat-stable baked carbon-containing body, said part manufactured cell component being a layered composite of two precursors, comprising;

a precursor layer of the aluminium-wettable refractory coating, said precursor layer containing at least one aluminium-wettable refractory material in particulate form, or a particulate micropyretic reaction mixture which when ignited reacts to form at least one aluminium-wettable refractory material, or a mixture thereof, and non-carbon fillers and binders; on a non-baked or part-baked precursor of the heat-stable carbon-containing body, comprising particulate carbon compacted with a heat-convertible binder which when subjected to heat treatment binds the particulate carbon into the heat-stable carbon-containing body of the fully-manufactured cell component;

the layered composite being convertible to the fully manufactured cell component by heat treatment to form said aluminium-wettable refractory coating and simultaneously bind and heat-stabilize the carbon-containing body.

2. The part-manufactured cell component of claim 1 wherein the precursor of the heat-stable carbon-containing body comprises a compacted mixture of particulate carbon, a particulate micropyretic reaction mixture which when ignited reacts to form at least one aluminium-wettable refractory material, and a colloidal binder.

3. The part-manufactured cell component of claim 2 wherein the precursor layer of the aluminium-wettable refractory coating contains a particulate micropyretic reaction mixture which when ignited reacts to form at least one aluminium-wettable refractory material, mixed with pre-formed particulate aluminium-wettable refractory material and a colloidal binder.

4. The part-manufactured cell component of claim 3 wherein the precursor of the heat-stable carbon-containing body and the precursor layer of the aluminium-wettable refractory coating each contain the same reaction mixture and the same colloidal binder.

5. The part-manufactured cell component of claim 4 wherein the precursor of the heat-stable carbon-containing body contains from 0.5 to 20 parts by weight of particulate carbon for 1 part by weight of the reaction mixture and said precursor layer contains from 0.5 to 20 parts by weight of pre-formed particulate aluminium-wettable refractory material for 1 part by weight of the reaction mixture.

6. The part-manufactured cell component of claim 5 wherein the precursor of the heat-stable carbon-containing body contains from 1 to 8 parts by weight, of particulate carbon for 1 part by weight of the reaction mixture, and said precursor layer contains from 1 to 8 parts by weight, of pre-formed particulate aluminium-wettable refractory material for 1 part by weight of the reaction mixture.

7. The part-manufactured cell component of claim 6 wherein the precursor of the heat-stable carbon-containing body contains from 1.5 to 4 parts by weight, of particulate carbon for 1 part by weight of the reaction mixture, and said precursor layer contains from 1.5 to 4 parts by weight, of pre-formed particulate aluminium-wettable refractory material for 1 part by weight of the reaction mixture.

8. The part-manufactured cell component of claim 4 wherein the weight fraction of the reaction mixture in the precursor of the heat-stable carbon-containing body is at least approximately the same as the weight fraction of the reaction mixture in said precursor layer.

9. The part-manufactured cell component of claim 4 wherein the reaction mixture comprises aluminium, boron oxide and titanium dioxide at least approximately in the molar ratio: $10Al:3B_2O_3:3TiO_2$.

10. The part-manufactured cell component of claim 3 wherein the reaction mixture and the pre-formed particulate refractory material of said precursor layer are mixed with from 0.1 ml to 1 ml, of the colloidal binder per gram of the reaction mixture plus the pre-formed particulate refractory hard material.

11. The part-manufactured cell component of claim 10 wherein the colloidal binder of said precursor layer is selected from the group consisting of colloidal alumina, silica, yttria, ceria, thoria, zirconia, magnesia, lithia and hydroxides, acetates and formates thereof, oxides and hydroxides of metals other than aluminum, yttrium, cerium, thorium, zirconium, magnesium and lithium, cationic species and mixtures thereof.

12. The part-manufactured cell component of claim 10 wherein the reaction mixture and the pre-formed particulate refractory material of said precursor layer are mixed with from 0.5 ml to 0.5 ml, of the colloidal binder per gram of the reaction mixture plus the pre-formed particulate refractory hard material.

13. The part-manufactured cell component of claim 2 wherein the reaction mixture and particulate carbon of the precursor of the heat-stable carbon-containing body are mixed with from 0.1 ml to 1 ml, of the colloidal binder per gram of the reaction mixture plus the particulate carbon.

14. The part-manufactured cell component of claim 13 wherein the colloidal binder of the precursor of the heat-stable carbon-containing body is selected from the group consisting of the colloidal alumina, silica, yttria, ceria, thoria, zirconia, magnesia, lithia and hydroxides, acetates and formates thereof, oxides and hydroxides of metals other than aluminum, yttrium, cerium, thorium, zirconium, magnesium, and lithium, cationic species and mixtures thereof.

15. The part-manufactured cell component of claims 14 or 12 wherein both the precursor layer of the aluminium-wettable refractory coating and the precursor of the heat-stable carbon-containing body contain colloidal alumina.

16. The part-manufactured cell component of claim 2 wherein the precursor layer of the aluminium-wettable refractory coating comprises pre-formed particulate refractory material in a dried colloid.

17. The part-manufactured cell component of claim 16 wherein the pre-formed particulate refractory material in said precursor layer is a boride selected from the group consisting of borides of titanium, chromium, vanadium, zirconium, hafnium, niobium, tantalum, molybdenum and cerium.

18. The part-manufactured cell component of claim 17 wherein the pre-formed particulate refractory boride in said precursor layer is titanium diboride and the reaction mixture of the precursor of the heat-stable carbon-containing material reacts to produce titanium diboride.

19. The part-manufactured cell component of claim 17 wherein the pre-formed particulate refractory boride in said precursor layer has a particle size below 100 micrometers.

20. The part-manufactured cell component of claim 19 wherein the pre-formed particulate refractory boride in said precursor layer comprises particles of different sizes to optimize packing of the particles, with a particle size ratio of at least 2:1.

21. The part-manufactured cell component of claim 20, wherein the particle size ratio of the pre-formed particulate refractory boride is in the range 3:1 to 10:1.

22. The cell component of claim 20 wherein the pre-formed particulate refractory boride in said precursor layer has particles with sizes in the range from about 3 micrometers to about 50 micrometers.

23. The part-manufactured cell component of claim 1 wherein the precursor of the heat-stable carbon-containing body comprises a compacted mixture of particulate carbon with aluminium and with at least one compound of lithium, aluminium, cerium, calcium and sodium in a liquid carrier, which mixture reacts when heated to form a binder comprising at least one of aluminium carbide, aluminium oxycarbide, aluminium nitride and aluminium oxynitride or mixtures thereof with metallic aluminium.

24. The part-manufactured cell component of claim 23 wherein the precursor of the heat-stable carbon-containing body comprises an aluminium compound selected from the group consisting of aluminium nitrate, aluminium carbonate, aluminium halides, aluminum borate and aluminum carbide and mixtures thereof.

25. The part-manufactured cell component of claim 24 wherein the precursor of the heat-stable carbon-containing body comprises a lithium compound selected from the group consisting or lithium acetate, lithium carbonate, lithium fluoride, lithium chloride, lithium oxalate, lithium, nitride, lithium nitrate, lithium formate and lithium aryl, lithium tetraborate and mixtures thereof.

26. The part-manufactured cell component of claim 24 wherein the precursor of the heat-stable carbon-containing body comprises 1 to 20 parts by weight of particulate aluminium for 80 to 99 parts by weight of particulate carbon.

27. The part-manufactured cell component of claim 26 wherein the particulate aluminium and particulate carbon are mixed with the compounds in the liquid carrier in an amount of 5 to 20 ml of the liquid carrier per 100 grams of the particulate aluminium and particulate carbon.

28. The part-manufactured cell component of claim 26 wherein the particulate aluminium in the precursor of the heat-stable carbon body has a dimension of at most 44 micrometer (−325 mesh).

29. The part-manufactured cell component of claim 26 wherein the particulate aluminium in the precursor of the heat-stable carbon body is wet milled aluminium derived from scrap foil.

30. The part-manufactured cell component of claim 23 wherein said liquid carrier comprises a binding agent selected from the group consisting of methyl cellulose, polyvinyl alcohol and colloids.

31. The part-manufactured cell component of claim 30 wherein said liquid carrier comprises a colloid selected from the group consisting of alumina, silica, yttria, ceria, thoria, zirconia, magnesia, lithia and hydroxides, acetates and formates thereof, oxides and hydroxides of metals other than aluminum, yttrium, cerium, thorium, zirconium, magnesium and lithium, cationic species and mixtures thereof.

32. The part-manufactured cell component of claim 30 wherein said liquid carrier comprises colloidal alumina, as the binding agent.

33. The part-manufactured cell component of claim 23 wherein the precursor layer of the aluminium-wettable refractory coating contains a particulate micropyretic reaction mixture which when ignited reacts to form at least one aluminium-wettable refractory material, mixed with pre-formed particulate aluminium-wettable refractory material and a colloidal binder.

34. The part-manufactured cell component of claim 33 wherein said precursor layer contains from 0.5 to 20 parts by weight of pre-formed particulate aluminium-wettable refractory material for 1 part by weight of the reaction mixture.

35. The part-manufactured cell component of claim 34 wherein said precursor layer contains from 1 to 8 parts by weight, of pre-formed particulate aluminium-wettable refractory material for 1 part by weight of the reaction mixture.

36. The part-manufactured cell component of claim 35 wherein said precursor layer contains from 1.5 to 4 parts by weight, of pre-formed particulate aluminium-wettable refractory material for 1 part by weight of the reaction mixture.

37. The part-manufactured cell component of claim 33 wherein said reaction mixture comprises aluminium, boron oxide, titanium, dioxide and titanium diboride as filler, at least approximately in the molar ratio: $10Al:3B_2O_3:3TiO_2$:from an infinitesimal molar ratio up to $20TiB_2$.

38. The part-manufactured cell component of claim 23 wherein the precursor layer of the aluminium-wettable refractory coating comprises pre-formed particulate refractory material in a dried colloid.

39. The part-manufactured cell component of claim 38 wherein the pre-formed particulate refractory material in said precursor layer is a boride selected from the group consisting of borides of titanium, chromium, vanadium, zirconium, hafnium, niobium, tantalum, molybdenum and cerium.

40. The part-manufactured cell component of claim 39 wherein said pre-formed particulate refractory boride in said precursor layer is titanium diboride and the reaction mixture of the precursor of the heat-stable carbon-containing material reacts to produce titanium diboride.

41. The part-manufactured cell component of claim 39 wherein said pre-formed particulate refractory boride has a particle size below 100 micrometers.

42. The part-manufactured cell component of claim 41 wherein said pre-formed particulate refractory boride comprises particles of different sizes to optimize packing of the particles, with a particle size ratio of at least 2:1.

43. The part-manufactured cell component of claim 42 wherein said particle size ratio of the pre-formed particulate refractory boride is in the range 3:1 to 10:1.

44. The part-manufactured cell component of claim 43 wherein said pre-formed particulate refractory boride has particles with sizes in the range from about 3 micrometers to about 50 micrometers.

45. The part-manufactured cell component of claim 1 wherein the precursor of the heat-stable carbon-containing body comprises a compacted mixture of particulate carbon with a non-carbonaceous colloidal binder and optionally with one or more fillers, the binder being a suspension of one or more colloids, or being derived from one or more colloid precursors or colloid reagents optionally with one or more chelating agents.

46. The part-manufactured cell component of claim 45 wherein said binder is a suspension selected from the group consisting of colloidal alumina, silica, yttria, ceria, thoria, zirconia, magnesia, lithia and hydroxides, acetates and formates thereof, oxides and hydroxides of metals other than aluminum, yttrium, cerium, thorium, zirconium, magnesium and lithium, cationic species and mixtures thereof.

47. The part-manufactured cell component of claim 45 wherein the precursor of the heat-stable carbon-containing body comprises one or more fillers selected from: bonding enhancing materials selected from the group consisting of methylcellulose, particulate alumina or urea; metallic, intermetallic, semi-metallic, polymeric, refractory ceramic materials; pyrolizable chlorosilanes, polycarbosilanes, polysilanes and other organometal polymers which pyrolyze to useful products for enhancing bonding, or their pyrolyzed products; and mixtures thereof.

48. The part-manufactured cell component of claim 47 wherein said ceramic materials are selected from the group consisting of borides, carbides, nitrides, silicides, oxides, oxynitrides, and mixtures thereof.

49. The part-manufactured cell component of claim 45 wherein the precursor of the heat-stable carbon-containing body comprises metallic aluminium as filler, in the form of particulates, chips, turnings or ground scrap pieces, or mixtures thereof.

50. The part-manufactured cell component of claim 45 wherein the precursor of the heat-stable carbon-containing body comprises 50 to 99 weight % of particulate carbon, 0 to 30 weight % of fillers and 1 to 30 weight % of the binder.

51. The part-manufactured cell component of claim 50 wherein the precursor of the heat-stable carbon-containing body comprises aluminium, alumina or a mixture of aluminium and alumina as a filler, and colloidal alumina as binder.

52. The part-manufactured cell component of claim 50 wherein the precursor of the heat-stable carbon-containing body comprises 50 to 95%, 0 to 30 weight % of fillers and 5 to 30 weight % of the binder.

53. The part-manufactured cell component of claim 45 wherein the precursor layer of the aluminium-wettable refractory coating contains a particulate micropyretic reaction mixture which when ignited reacts to form at least one aluminium-wettable refractory material, mixed with pre-formed particulate aluminium-wettable refractory material and a colloidal binder.

54. The part-manufactured cell component of claim 53 wherein said precursor layer contains from 0.5 to 20 parts by weight of pre-formed particulate aluminium-wettable refractory material for 1 part by weight of the reaction mixture.

55. The part-manufactured cell component of claim 54 wherein said precursor layer contains from 1 to 8 parts by weight, of pre-formed particulate aluminium-wettable refractory material for 1 part by weight of the reaction mixture.

56. The part-manufactured cell component of claim 55 wherein said precursor layer contains from 1.5 to 4 parts by weight, of pre-formed particulate aluminium-wettable refractory material for 1 part by weight of the reaction mixture.

57. The part-manufactured cell component of claim 53 wherein said reaction mixture comprises aluminium, boron oxide and titanium dioxide at least approximately in the molar ratio: $10Al:3B_2O_3:3TiO_2$.

58. The part-manufactured cell component of claim 45 wherein the precursor layer of the aluminium-wettable refractory coating comprises pre-formed particulate refractory material in a dried colloid.

59. The part-manufactured cell component of claim 58 wherein the pre-formed particulate refractory material in said precursor layer is a boride selected from the group consisting of borides of titanium, chromium, vanadium, zirconium, hafnium, niobium, tantalum, molybdenum and cerium.

60. The part-manufactured cell component of claim 59 wherein the pre-formed particulate refractory boride in said precursor layer is titanium diboride and the mixture of the precursor of the heat-stable carbon-containing material reacts to produce titanium diboride.

61. The part-manufactured cell component of claim 59 wherein the pre-formed particulate refractory boride in said precursor layer has a particle size below 100 micrometers.

62. The part-manufactured cell component of claim 61 wherein the pre-formed particulate refractory boride in said precursor layer comprises particles of different sizes to optimize packing of the particles, with a particle size ratio of at least 2:1.

63. The part-manufactured cell component of claim 62 wherein the particle size ratio of the pre-formed particulate refractory boride is in the range 3:1 to 10:1.

64. The part-manufactured cell component of claim 62 wherein the pre-formed particulate refractory boride in said precursor layer has particles with sizes in the range from about 3 micrometers to about 50 micrometers.

65. The part-manufactured cell component of claim 1 wherein the particulate carbon of the precursor of the heat-stable carbon-containing body is selected from the group consisting petroleum coke, metallurgical coke, anthracite, graphite, amorphous carbon, fullerene and mixtures thereof.

66. The part-manufactured cell component of claim 65 wherein the size of the particulate carbon is up to 40 mm.

67. The part-manufactured cell component of claim 66 wherein the particulate carbon contains between 5% and 40% of particles having a size below 0.2 mm.

68. The part-manufactured cell component of claim 66 wherein the size of the particulate carbon is between 1 micrometer and 30 mm.

69. The part-manufactured cell component of claim 65, wherein at least part of the particulate carbon is fibrous.

70. The part-manufactured cell component of claim 1 comprising sufficient carbon to form a fully-manufactured heat-stable carbon-containing body containing at least 50 weight % carbon.

71. The part-manufactured cell component of claim 70 comprising sufficient carbon to form a fully-manufactured heat-stable carbon-containing body containing between 70 and 85 weight % carbon.

72. The part-manufactured cell component of claim 1 wherein the precursor of the heat-stable carbon-containing body comprises one or more fillers selected from the group consisting of: methyl-cellulose, particulate alumina or urea; metallic, intermetallic, semi-metallic, polymeric, refractory, and/or ceramic materials; pyrolizable chlorosilanes, polycarbosilanes, polysilanes and other organometal polymers, or their pyrolyzed products; and mixtures thereof.

73. The part-manufactured cell component of claim 72 wherein said ceramic materials are selected from the group consisting of borides, carbides, nitrides, silicides, oxides, oxynitrides, and mixtures thereof.

74. The part-manufactured cell component of claim 1 wherein the precursor of the heat-stable carbon-containing body comprises a compact mixture of particulate carbon with pitch as a heat-curable carbonaceous binder.

75. The part-manufactured cell component of claim 74 wherein the precursor of the heat-stable carbon-containing body comprises a compact mixture of particulate anthracite, metallurgical coke, graphite with pitch.

76. The part-manufactured cell component of claim 74 wherein the precursor of the heat-stable carbon-containing body further comprises a non-carbonaceous colloidal binder.

77. The part-manufactured cell component of claim 74 wherein the precursor layer of the aluminium-wettable refractory coating contains a particulate micropyretic reaction mixture which when ignited reacts to form at least one aluminium-wettable refractory material, mixed with pre-formed particulate aluminium-wettable refractory material and a colloidal binder.

78. The part-manufactured cell component of claim 74 wherein the precursor layer of the aluminium-wettable refractory coating comprises pre-formed particulate refractory material in a dried colloid.

79. A method of manufacturing a component of an aluminium production cell, in particular a cathode or a cell lining of an electrolytic cell for the production of aluminium by the electrolysis of alumina in a molten halide electrolyte, which cell component comprises an aluminium-wettable refractory coating layer on a heat-stable baked carbon-containing body, the method comprising:
providing a part-manufactured cell component which is a layered composite of two precursors, as defined in claim 1; and
converting the layered composite to the fully-manufactured cell component by heat treatment to form said aluminium-wettable refractory coating and simultaneously bind and heat-stabilize the carbon-containing body.

80. The method of claim 79 wherein the precursor of the heat-stable carbon-containing body is provided by mixing particulate carbon, a particulate micropyretic reaction mixture which when ignited reacts to form at least one aluminium-wettable refractory material, and a colloidal binder, and compacting this mixture.

81. The method of claim 80 wherein the precursor layer of the aluminium-wettable refractory coating is provided by mixing a particulate micropyretic reaction mixture, which when ignited reacts to form at least one aluminium-wettable refractory material, with pre-formed particulate aluminium-wettable refractory material and a colloidal binder, and compacting the mixture; and wherein the layered composite is heated rapidly to ignite both reaction mixtures substantially simultaneously.

82. The method of claim 81 wherein the reaction mixture and the pre-formed particulate refractory material of said precursor layer are mixed with from 0.1 ml to 1 ml, of colloidal binder per gram of the reaction mixture and pre-formed particulate refractory material.

83. The method of claim 82 wherein the colloidal binder of said precursor layer is selected from the group consisting of colloidal alumina, silica, yttria, ceria, thoria, zirconia, magnesia and lithia and hydroxides, acetates and formates thereof, oxides and hydroxides of metals other than aluminum, yttrium, cerium, thorium, zirconium, magnesium and lithium, cationic species and mixtures thereof.

84. The method of claim 82 wherein the reaction mixture and the pre-formed particulate refractory material of said precursor layer are mixed with from 0.15 ml to 0.5 ml, of colloidal binder per gram of the reaction mixture and pre-formed particulate refractory material.

85. The method of claim 80 comprising providing a precursor layer of the aluminium-wettable refractory coating and a precursor of the heat-stable carbon-containing body which each contain the same reaction mixture and the same colloidal binder.

86. The method of claim 85 wherein the precursor of the heat-stable baked carbon-containing body is formed by mixing from 0.5 to 20 parts by weight of particulate carbon with 1 part by weight of the reaction mixture, and said precursor layer is formed by mixing from 0.5 to 20 parts by weight of pre-formed particulate aluminium-wettable refractory material with 1 part by weight of the reaction mixture.

87. The method of claim 86 wherein the precursor of the heat-stable carbon-containing body is formed by mixing from 1 to 8 parts by weight, of particulate carbon for 1 part by weight of the reaction mixture, and said precursor layer is formed by mixing from 1 to 8 parts by weight, of pre-formed particulate aluminium-wettable refractory material with 1 part by weight of the reaction mixture.

88. The method of claim 87 wherein the precursor of the heat-stable carbon-containing body is formed by mixing from 1.5 to 4 parts by weight, of particulate carbon for 1 part by weight of the reaction mixture, and said precursor layer is formed by mixing from 1.5 to 4 parts by weight, of pre-formed particulate aluminium-wettable refractory material with 1 part by weight of the reaction mixture.

89. The method of claim 86 wherein the weight fraction of the reaction mixture in the precursor of the heat-stable carbon-containing body is at least approximately the same as the weight fraction of the reaction mixture in said precursor layer.

90. The method of claim 85 wherein the reaction mixture comprises aluminium, boron oxide and titanium dioxide at least approximately in the molar ratio: $10Al:3B_2O_3:3TiO_2$.

91. The method of claim 80 wherein the reaction mixture and particulate carbon of the precursor of the heat-stable carbon-containing body are mixed with from 0.1 ml to 1 ml, of colloidal binder per gram of the reaction mixture and particulate carbon.

92. The method of claim 91 wherein the colloidal binder of the precursor of the heat-stable carbon-containing body is selected from the group consisting of colloidal alumina, silica, yttria, ceria, thoria, zirconia, magnesia and lithia and hydroxides, acetates and formates thereof, oxides and hydroxides of metals other than aluminum, yttrium, cerium, thorium, zirconium, magnesium and lithium, cationic species and mixtures thereof.

93. The method of claims 92 or 83 wherein both the precursor layer of the aluminium-wettable refractory coating and the precursor of the heat-stable carbon-containing body contain colloidal alumina.

94. The method of claim 91 wherein the reaction mixture and particulate carbon of the precursor of the heat-stable carbon-containing body are mixed with from 0.15 ml to 0.5 ml, of colloidal binder per gram of the reaction mixture and particulate carbon.

95. The method of claim 80 wherein the precursor layer of the aluminium-wettable refractory coating is provided by applying pre-formed particulate refractory material in a colloid and drying, the pre-formed particulate refractory material being consolidated by the heat treatment.

96. The method of claim 95 wherein the pre-formed particulate refractory material in said precursor layer is a boride selected from the group consisting of borides of titanium, chromium, vanadium zirconium, hafnium, niobium, tantalum, molybdenum and cerium and mixtures thereof.

97. The method of claim 96 wherein the pre-formed particulate refractory boride in said precursor layer is titanium diboride and the reaction mixture of the precursor of the heat-stable carbon-containing material reacts to produce titanium diboride.

98. The method of claim 96 wherein the pre-formed particulate refractory boride in said precursor layer has a particle size below 100 micrometers.

99. The method of claim 98 wherein the pre-formed particulate refractory boride in said precursor layer comprises particles of different sizes to optimize packing of the particles, with a particle size ratio of at least 2:1.

100. The method of claim 99 wherein the particle size ratio of the pre-formed particulate refractory boride is in the range 3:1 to 10:1.

101. The method of claim 99 wherein the pre-formed particulate refractory boride in said precursor layer has particles with sizes in the range from about 3 micrometers to about 50 micrometers.

102. The method of claim 79 wherein the particulate carbon of the precursor of the heat-stable carbon-containing body is selected from the group consisting of petroleum coke, metallurgical coke, anthracite, graphite, amorphous carbon, fullerene and mixtures thereof.

103. The method of claim 102 wherein the size of the particulate carbon is up to 40 mm.

104. The method of claim 103 wherein the particulate carbon contains between 5% and 40% of particles having a size below 0.2 mm.

105. The method of claim 102 wherein at least part of the particulate carbon is fibrous.

106. The method of claim 102 wherein the size of the particulate carbon is between 1 micrometer and 30 mm.

107. The method of claim 79 wherein the resulting heat-stable carbon-containing body contains at least 50 weight % of carbon.

108. The method of claim 107 wherein the resulting heat-stable carbon-containing body contains from 70 to 85 weight % of carbon.

109. The method of claim 79 wherein the precursor of the heat-stable carbon-containing body is provided by compacting a mixture of particulate carbon with aluminium and with at least one compound of lithium, aluminium, cerium, calcium and sodium in a liquid carrier, which mixture reacts when heated to form a binder comprising at least one of aluminium carbide, aluminium oxycarbide, aluminium nitride and aluminium oxynitride or mixtures thereof with metallic aluminium.

110. The method of claim 109 wherein the precursor of the heat-stable carbon-containing body comprises an aluminium compound selected from the group consisting of aluminium nitrate, aluminium carbonate, aluminium halides, aluminium borate and aluminium carbide and mixtures thereof.

111. The method of claim 110 wherein the precursor of the heat-stable carbon-containing body comprises a lithium compound selected from the group consisting of lithium acetate, lithium, carbonate, lithium fluoride, lithium chloride, lithium oxalate, lithium nitride, lithium nitrate, lithium formate and lithium aryl, lithium tetraborate and mixtures thereof.

112. The method of claim 110 wherein the precursor of the heat-stable carbon-containing body comprises 1 to 20 parts by weight of particulate aluminium for 80 to 99 parts by weight of particulate carbon.

113. The method of claim 112 wherein the particulate aluminium and particulate carbon are mixed with the compounds in the liquid carrier in an amount of 5 to 20 ml of the liquid carrier per 100 grams of the particulate aluminium and particulate carbon.

114. The method of claim 112 wherein the particulate aluminium in the precursor of the heat-stable carbon body has a dimension of at most 44 micrometer (−325 mesh).

115. The method of claim 112 wherein the particulate aluminium in the precursor of the heat-stable carbon body is wet milled aluminium derived from scrap foil.

116. The method of claim 109 wherein said liquid carrier comprises a binding agent selected from methyl cellulose, polyvinyl alcohol and colloids.

117. The method of claim 116 wherein said liquid carrier comprises a colloid selected from the group consisting of alumina, silica, yttria, ceria, thoria, zirconia, magnesia, lithia and hydroxides, acetates and formates thereof, oxides and hydroxides of metals other than aluminum, yttrium, cerium, thorium, zirconium, magnesium and lithium, cationic species and mixtures thereof.

118. The method of claim 116 wherein said binding agent is colloidal alumina.

119. The method of claim 109 wherein the precursor layer of the aluminium-wettable refractory coating contains a particulate micropyretic reaction mixture which reacts to form at least one aluminium-wettable refractory material, mixed with pre-formed particulate aluminium-wettable refractory material and a colloidal binder.

120. The method of claim 119 wherein said precursor layer contains from 0.5 to 20 parts by weight of pre-formed particulate aluminium-wettable refractory material for 1 part by weight of the reaction mixture.

121. The method of claim 120 wherein said precursor layer contains from 1 to 8 parts by weight, of pre-formed particulate aluminium-wettable refractory material for 1 part by weight of the reaction mixture.

122. The method of claim 121 wherein said precursor layer contains from 1.5 to 4 parts by weight, of pre-formed particulate aluminium-wettable refractory material for 1 part by weight of the reaction mixture.

123. The method of claim 119 wherein said reaction mixture comprises aluminium, boron oxide, titanium dioxide and titanium diboride as filler, at least approximately in the molar ratio: $10Al:3B_2O_3:3TiO_2$ from an infinitesimal molar ratio up to $20TiB_2$.

124. The method of claim 109 wherein the precursor layer of the aluminium-wettable refractory coating is provided by applying a pre-formed particulate refractory material in a colloid and drying.

125. The method of claim 124 wherein the pre-formed particulate refractory material in said precursor layer is a boride selected from borides of titanium, chromium, vanadium, zirconium, hafnium, niobium, tantalum, molybdenum and cerium.

126. The method of claim 125 wherein said pre-formed particulate refractory boride in said precursor layer is titanium diboride and the reaction mixture of the precursor of the heat-stable carbon-containing material reacts to produce titanium diboride.

127. The method of claim 125 wherein said pre-formed particulate refractory boride has a particle size below 100 micrometers.

128. The method of claim 127 wherein said pre-formed particulate refractory boride comprises particles of different sizes to optimize packing of the particles, with a particle size ratio of at least 2:1.

129. The method of claim 128 wherein said particle size ratio of the pre-formed particulate refractory boride is in the range 3:1 to 10:1.

130. The method of claim 129 wherein said pre-formed particulate refractory boride has particles with sizes in the range from about 3 micrometers to about 50 micrometers.

131. The method of claim 79 wherein the precursor of the heat-stable carbon-containing body comprises a compacted mixture of particulate carbon with a non-carbonaceous colloidal binder and optionally with one or more fillers, the binder being a suspension of one or more colloids, or being derived from one or more colloid precursors or colloid reagents optionally with one or more chelating agents.

132. The method of claim 131 wherein said binder is a suspension selected from the group consisting of colloidal alumina, silica, yttria, ceria, thoria, zirconia, magnesia, lithia and hydroxides, acetates and formates thereof, oxides and hydroxides of metals other than aluminum, yttrium, cerium, thorium, zirconium, magnesium and lithium cationic species and mixtures thereof.

133. The method of claim 131 wherein the precursor of the heat-stable carbon-containing body comprises one or more fillers selected from the group consisting of: methylcellose, particulate alumina or urea; metallic, intermetallic, semi-metallic, polymeric, refractory, ceramic materials; pyrolizable chlorisilanes, polycarbosilanes, polysilanes and other organometal polymers, or their pyrolyzed products; and mixtures thereof.

134. The method of claim 133 wherein ceramic materials are selected from the group consisting of borides, carbides, nitrides, silicides, oxides, oxynitrides, and mixtures thereof.

135. The method of claim 131 wherein the precursor of the heat-stable carbon-containing body comprises metallic aluminium as filler, in the form of particulates, chips, turnings or ground scrap pieces, or mixtures thereof.

136. The method of claim 131 wherein the precursor of the heat-stable carbon-containing body comprises 50 to 99 weight % of particulate carbon, 0 to 30 weight % of fillers and 1 to 30 weight % of the binder.

137. The method of claim 136 wherein the precursor of the heat-stable carbon-containing body comprises aluminium, alumina or a mixture of aluminium and alumina as a filler, and colloidal alumina as binder.

138. The method of claim 136 wherein the precursor of the heat-stable carbon-containing body comprises 50 to 95% of particulate carbon, 0 to 30 weight % of fillers and 5 to 30% of the binder.

139. The method of claim 131 wherein the precursor layer of the aluminium-wettable refractory coating contains a particulate micropyretic reaction mixture which when ignited reacts to form at least one aluminium-wettable refractory material, mixed with pre-formed particulate aluminium-wettable refractory material and a colloidal binder.

140. The method of claim 139 wherein said precursor layer contains from 0.5 to 20 parts by weight of pre-formed particulate aluminium-wettable refractory material for 1 part by weight of the reaction mixture.

141. The method of claim 140 wherein said precursor layer contains from 1 to 8 parts by weight, of preformed particulate aluminium-wettable refractory material for 1 part by weight of the reaction mixture.

142. The method of claim 140 wherein said precursor layer contains from 1.5 to 4 parts by weight, of pre-formed particulate aluminium-wettable refractory material for 1 part by weight of the reaction mixture.

143. The method of claim 139 wherein said reaction mixture comprises aluminium, boron oxide and titanium dioxide at least approximately in the molar ratio: $10Al:3B_2O_3:3TiO_2$.

144. The method of claim 131 wherein the precursor layer of the aluminium-wettable refractory coating is provided by applying pre-formed particulate refractory material in a colloid and drying.

145. The method of claim 144 wherein the pre-formed particulate refractory material in said precursor layer is a boride selected from the group consisting of borides of titanium, chromium, vanadium, zirconium, hafnium, niobium, tantalum, molybdenum and cerium.

146. The method of claim 145 wherein the pre-formed particulate refractory boride in said precursor layer is titanium diboride and the mixture of the precursor of the heat-stable carbon-containing material reacts to produce titanium diboride.

147. The method of claim 145 wherein the pre-formed particulate refractory boride in said precursor layer has a particle size below 100 micrometers.

148. The method of claim 147 wherein the pre-formed particulate refractory boride in said precursor layer comprises particles of different sizes to optimize packing of the particles, with a particle size ratio of at least 2:1.

149. The method of claim 148 wherein the particle size ratio of the pre-formed particulate refractory boride is in the range 3:1 to 10:1.

150. The method of claim 148 wherein the pre-formed particulate refractory boride in said precursor layer has particles with sizes in the range from about 3 micrometers to about 50 micrometers.

151. The method of claim 79 wherein said heat treatment is followed by aluminizing the aluminium-wettable refractory coating layer.

152. The method of claim 151 wherein said aluminizing is carried out by placing said surface in contact with molten aluminium in the presence of a fluxing agent.

153. A component of an aluminium production cell, for the production of aluminium by the electrolysis of alumina in a molten halide electrolyte, said cell component being obtained by simultaneous heat treatment of a layered composite of two precursors, and comprising:

an aluminium-wettable refractory coating obtained from a precursor layer containing at least one aluminium-wettable refractory material in particulate form, or a particulate micropyretic reaction mixture which when ignited reacts to form at least one aluminium-wettable refractory material, or a mixture thereof, and non-carbon fillers and binders; on a heat-stable baked carbon-containing body obtained from a non-baked or part-baked precursor comprising particulate carbon compacted with a colloidal binder which when subjected to heat treatment binds the particulate carbon into the heat-stable carbon-containing body of the fully-manufactured cell component.

154. The cell component of claim 153 which is a cathode block that can be assembled into a cathodic cell bottom.

* * * * *